June 24, 1930.  O. H. DORER ET AL  1,766,706

PACKING

Filed Oct. 24, 1927

OSCAR H. DORER.
AND
GERRIT H. VAN HENGEL.
INVENTOR

BY *Robe Meyer*

ATTORNEY

Patented June 24, 1930

1,766,706

UNITED STATES PATENT OFFICE

OSCAR H. DORER, OF EAST ORANGE, AND GERRIT H. VAN HENGEL, OF ORANGE, NEW JERSEY, ASSIGNORS TO WORTHINGTON PUMP AND MACHINERY CORPORATION, OF NEW YORK, N. Y., A CORPORATION OF VIRGINIA

PACKING

Application filed October 24, 1927. Serial No. 228,193.

This invention relates to packing or stuffing boxes and more particularly to a packing for use in high pressure pumps, which will prevent objectionable leakage and to a great extent overcome the necessity of frequent tightening of the packing and replacing of parts thereof.

In high pressure pumps, particularly centrifugal pumps, handling very high pressure fluids, the chief source of annoyance has been the lack of a packing sufficient to withstand the pressures to which it is subjected, thereby causing leakage and requiring very frequent adjustment and replacing of packing parts.

It is an object of the present invention to provide a packing which is simple in construction and may be manufactured and installed at a relatively low cost, yet one which will overcome the annoyance, due to packing, in pumps or analogous mechanism handling fluids under very high pressures.

The present invention comprises a packing structure in which the pressure of the leakage fluid, along the shaft, is gradually decreased in a step-by-step manner until it reaches a suitable drain and one in which parts of the packing are urged into tight packing or leakage arresting position by the pressure of the leaking fluid.

With these objects in view, the invention consists in various features of construction and combination of parts, which will be first described in connection with the accompanying drawings showing a packing of the preferred form embodying the invention, and the features forming the invention will be specifically pointed out in the claims.

Figure 1:
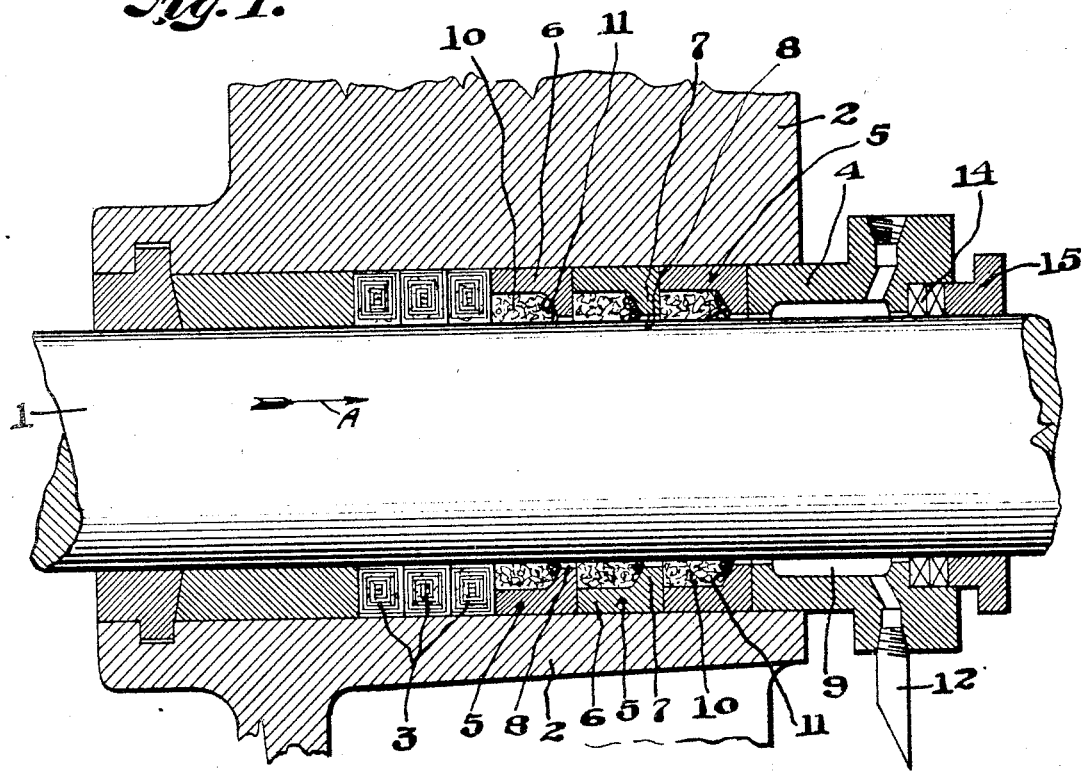
Fig. 1 is a longitudinal section through the improved packing.
Figure 2:
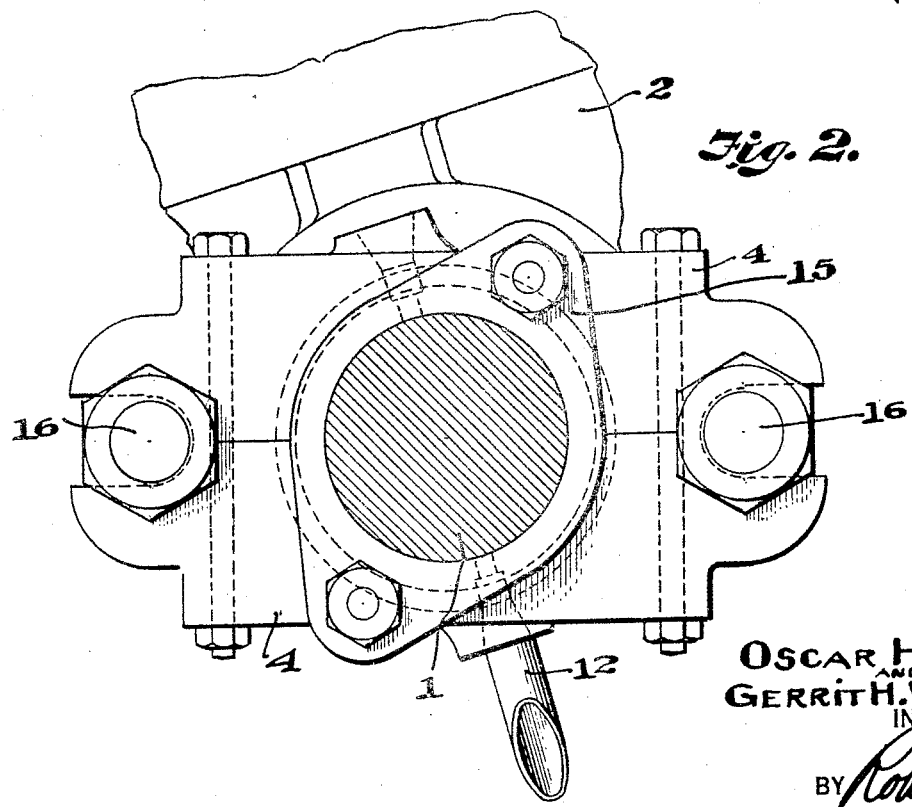
Fig. 2 is an end view of the packing.

Referring more particularly to the drawings, the improved packing structure is shown mounted about a shaft 1, which may be the shaft of a high pressure centrifugal pump or analogous mechanism and the packing is enclosed in a suitable housing or casing 2. The leakage of fluid is along the shaft 1 in the direction indicated by the arrow A, and the improved packing structure comprises a plurality of rings 3 of semi-soft packing. This semi-soft packing may be of any approved type such as folded metallic packing. These rings 3 are engaged first by the fluid leaking along the shaft 1 and result in the initial step of lowering the pressure of the fluid.

Positioned between the semi-soft packing rings 3 and the packing gland 4 are a plurality of metal rings 5 which are L shaped in cross section with the edge of their circumferential portion 6 abutting the adjacent surface of the radial portion 7 of the ring next thereto.

The outer surface of the radial portion 7 of the outermost ring 6, is in flat abutting engagement with the inner end of the gland 4.

The inner perimeters of the radial portions 7 of the rings 6 are spaced from the shaft 1, providing leakage ducts or passageways 8 from one ring to the other and to the drain chamber 9 in the packing gland 4. Shredded or soft stranded metallic packing, as shown at 10, is placed in the circular spaces or pockets formed between the rings 6 and the shaft 1 and the inner sides of the radial portion 7 of the rings 6 incline towards the entrance ends of the ducts 8, and away from the direction of entrance of leakage fluid into the pockets so that the pressure of the fluid entering the pockets in which the soft stranded packing 10 is positioned will, in engaging the packing, urge it against the inner inclined face 11 of the radial portion 7 and these inclined surfaces will in turn cause the packing 10 to be crowded towards the entrance ends of the ducts 8, thereby forcing the soft stranded packing 10, by the pressure of the leakage fluid, to the points where the packing is most desired for decreasing leakage of the fluid. As the fluid leaks from one of the rings 6 to the other, successively along the shaft 1, its pressure will be decreased which will retard its speed of flow, which, together with the forcing of the soft packing 10 towards the entrance ends of the ducts 8 and the action of the semi-soft rings 3, build up a resisting pressure against fluid leakage along the shaft 1 and materially reduce such leakage. The fluid which finally leaks into the chamber 9 is permitted to drain therefrom, through a suitable drain 12, and any leakage of fluid from the chamber 9 along the shaft 1 is prevented by the packing 14 which may be of any approved type and which is held in place by the gland 15. Any tightening of the packing structure through the medium of the bolts 16, which engage the sectional gland 4 and may be connected to the casing 2, for the purpose of cramping the rings 3, will have very little if any effect on the soft packing 10, owing to the protection of said soft packing by the L shaped metal rings 5.

It will be understood that the invention is not to be limited to the specific construction or arrangement of parts shown but that these may be modified widely within the invention defined by the claims.

What is claimed is:

1. In a packing, the combination with a shaft, of a plurality of metal rings L shaped in cross section and positioned to provide pockets about the shaft within the rings and having the inner perimeters of their radial portions spaced from the shaft to provide leakage ducts from one pocket to the pocket next thereto, and flexible packing in said pockets and engaging said shaft.

2. In a packing, the combination with a shaft, of a plurality of metal rings L shaped in cross section and positioned to provide pockets about the shaft within the rings and having the inner perimeters of their radial portions spaced from the shaft to provide leakage ducts from one pocket to the pocket next thereto, and soft flexible packing in said pockets, the inner sides of the radial portions of said rings inclining away from the direction of entrance of leakage fluid into the ducts whereby the soft packing will be forced to the entrance ends of said ducts by pressure of fluid entering the pockets.

3. In a packing, the combination with a shaft, of a plurality of semi-soft packing rings positioned at the inner end of the packing to first engage fluid leaking along the shaft and cause initial reduction of pressure of the fluid, a plurality of metal rings L shaped in cross section and positioned to provide pockets about the shaft within the rings and having the inner perimeters of their radial portions spaced from the shaft to provide leakage ducts from the one pocket to the one next thereto, soft flexible packing in said pockets and engaging said shaft, and a packing gland engaging the outermost of said L shaped rings, said packing gland provided with a drainage chamber having a drip outlet.

4. In a packing, the combination with a shaft, of a plurality of semi-soft packing rings positioned at the inner end of the packing to first engage fluid leaking along the shaft and cause initial reduction of pressure of the fluid, a plurality of metallic rings L shaped in cross section and positioned to provide pockets about the shaft within the rings and having the inner perimeters of their radial portions spaced from the shaft to provide leakage ducts from one pocket to the one next thereto, soft stranded packing in said pockets, and a packing gland engaging the outermost of said L shaped rings, the inner sides of the radial portions of said rings inclining away from the direction of entrance of leakage fluid into the ducts, whereby the soft packing will be forced to the entrance ends of said ducts by pressure of fluid entering the pocket.

5. In a packing, the combination with a shaft, of a plurality of semi-soft packing rings positioned at the inner end of the packing, a plurality of metal rings L shaped in cross section positioned to provide a pocket about the shaft in each ring and to provide drainage ducts from one pocket to the other, soft flexible packing in said pockets and a packing gland engaging the outermost of said metal rings whereby adjustment of the gland will cramp the semi-soft packing rings without affecting the soft flexible packing in the pockets.

In testimony whereof we affix our signatures.

OSCAR H. DORER.
GERRIT H. van HENGEL.